Feb. 12, 1963  F. R. J. FOWLER  3,077,298
FRICTION FAN DRIVE
Filed June 17, 1959
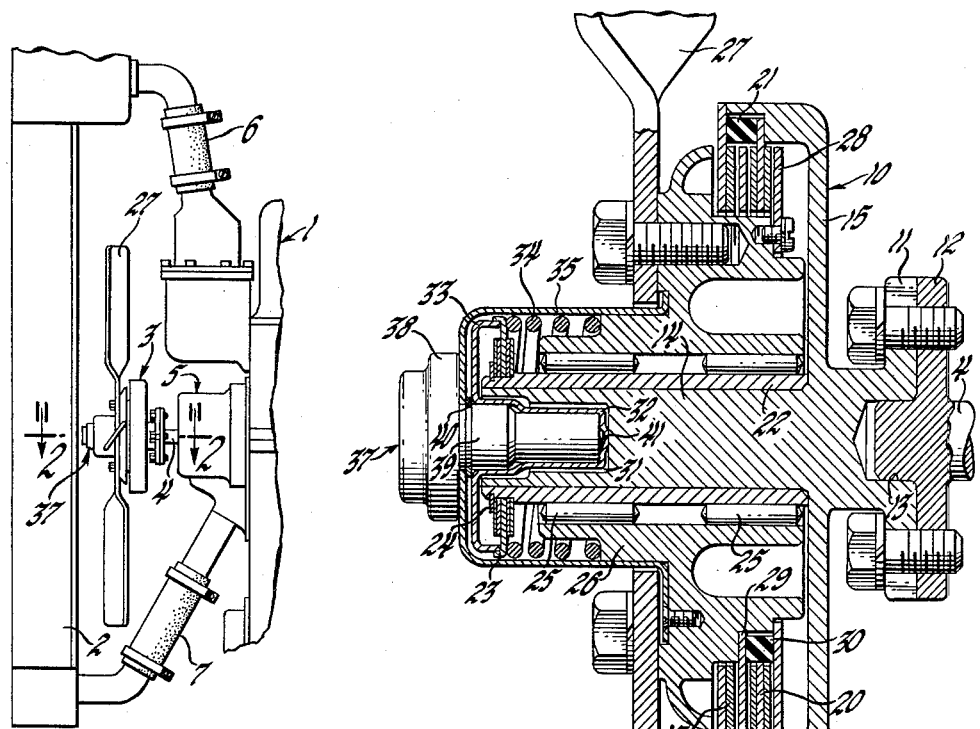
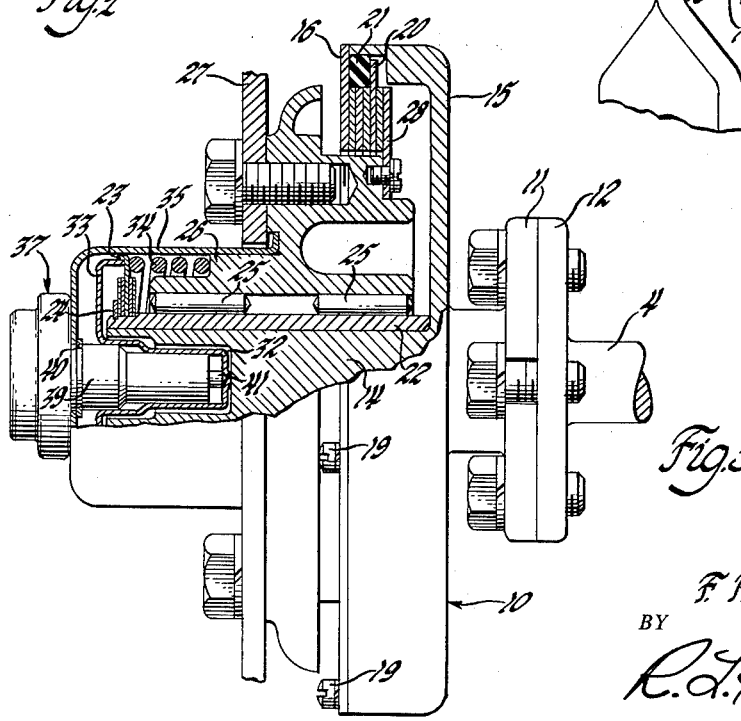
INVENTOR.
F. Robert J. Fowler
BY
R. L. Spencer
ATTORNEY

United States Patent Office 3,077,298
Patented Feb. 12, 1963

3,077,298
FRICTION FAN DRIVE
F. Robert J. Fowler, Flint, Mich., assignor to General Motors Corporation, Detroit, Mich., a corporation of Delaware
Filed June 17, 1959, Ser. No. 821,041
12 Claims. (Cl. 230—271)

This invention relates to fan drives and more particularly to an improved fan drive of the type incorporating an engageable and releasable clutch whereby the fan may alternately be positively driven or permitted to idle.

An object of this invention is to provide a fan drive unit which is of a simple and compact construction.

Another object of this invention is to provide a fan drive unit incorporating an engageable and releasable clutch controlled by a temperature responsive power unit.

A further object of this invention is to provide a fan drive unit having a fan hub supported for rotation upon a drive shaft such that drive belts and fan pulleys may be eliminated.

An additional object of this invention is to provide a fan drive unit incorporating an engageable and releasable clutch controlled by a temperature responsive power unit wherein the fan blades, when driven apply a force to the fan hub which assists in engaging the clutch.

A more particular object of this invention is to provide a fan drive unit incorporating a temperature responsive power unit for initiating engagement of a clutch, wherein the power unit, in and of itself, is incapable of fully applying the clutch and wherein the driven fan after partial clutch engagement applies an additional clutch applying force which in conjunction with the force applied by the temperature responsive power element is capable of completing clutch engagement.

Another object of this invention is to provide a fan drive arrangement incorporating an engageable and releasable clutch of the friction type in which the clutch engaging action is accomplished in two stages to assure smooth clutch engaging action.

These and other objects of this invention will be apparent from the following description and claims taken in conjunction with the accompanying drawings in which:

FIGURE 1 is a fragmentary side elevation of an engine equipped with a fan drive unit constructed in accordance with the principles of this invention.

FIGURE 2 is a sectional view of a fan drive unit assembly illustrating the clutch discs as being released.

FIGURE 3 is a partially sectional view of the fan drive assembly illustrating the clutch discs as being engaged.

Referring to FIGURE 1, there is shown schematically a vehicle engine indicated generally at 1, a radiator 2, and a fan unit 3. Fan unit 3 is mounted upon the end of a drive shaft 4 for driving a water pump indicated generally at 5. Radiator 2 is connected at its inlet to engine 1 by means of a flexible hose 6 and to a coolant water pump 5 by means of a flexible hose 7. By mounting the fan unit directly upon water pump drive shaft 4, the need for a fan belt and fan pulley and the cost thereof is eliminated.

Referring to FIGURE 2, a drive hub 10 is provided with a mounting flange 11 for attachment to a drive flange 12 on water pump drive shaft 4. Shaft 4 is piloted in drive hub 10 at 13. Drive hub 10 includes an axially extending cylindrical portion 14 which serves as a support member, and a radially extending portion 15 which carries a retainer clutch plate 16 secured thereto, plate 16 having a friction surface 17 thereon. Retainer clutch plate 16 is detachably secured to the end of an axially extending flange 18 by means of a series of screws 19, only one of which is shown. A second clutch plate 20 carried by flange 18 is spaced from retainer plate 16 by means of a plurality of expanded rubber spacers 21, only one of which is shown. Rim 18 is recessed to receive the rubber spacers 21. Portion 14 of drive hub 10 supports a bushing 22 having a thrust washer 23 fixed thereon by a snap ring 24. Bushing 22 constitutes a race member for bearings 25 upon which is rotatably supported a fan hub 26 carrying fan blades 27. Fan hub 26 carries a retainer clutch plate 28 and a clutch plate 29 separated from each other by a plurality of rubber spacers 30. There are four spacers 21 and 30, although only one of each is shown.

Cylindrical extension 14 of drive hub 10 is recessed at 31 to receive a retainer 32, the retainer having an enlarged end 33 contacting thrust washer 23. A spring 34 has one end seated upon fan hub 26 and the other end seated upon thrust washer 23. The assembly including spring 34, thrust washer 23 and retainer 32 is enclosed by a cover 35 secured to driven fan hub 26. A temperature responsive power element indicated generally at 37 includes an enlarged head portion 38 contacting the external surface of cover 35 and a reduced body portion 39 extending through an opening in cover 35. A snap ring 40 on the external surface of body portion 39 contacts the internal surface of cover 35 to connect the body of power element 37 to cover 35. Power element 37 contains an expansible medium (not shown) and a piston 41, the piston 41 contacting the closed end of retainer 32. Bearings 25 both rotate and slide axially on race 22.

In operation, considering the engine to be cold, the temperature of power element 37 will be such that piston 41 will be unable to exert force upon retainer 32. Spring 34, seated upon thrust washer 23 fixed to sleeve 22 will yieldably bias the driven hub 26 axially to the right as viewed in FIGURE 2, to release the clutch plates 20, 29. The flexible rubber spacers 21, 30 assure complete release of the clutch plates without drag when hub 26 is moved axially to the right by spring 34.

Assuming the air is heated up as it passes through radiator 2 of FIGURE 1, power element 37 will be heated by the air and the expandible material in the power element will force piston 41 against the end of retainer 32. Retainer 32 is constrained against movement, since it is seated upon thrust washer 23 fixed to bearing race 22. Body 39 of power element 37 moves axially to the left as viewed in FIGURE 2, carrying with it cover 35 to which it is attached by snap ring 40. Cover 35 is attached to driven hub 26, whose bearings 25 both rotate and are axially movable upon race 22. This causes the driven clutch plates 28 and 29 to contact the drive clutch plates 16 and 20. The engagement of the clutch plates is only partial due to the fact that power element 37, in and of itself cannot exert sufficient force against the action of release spring 34 to cause complete clutch engagement. The partial clutch engagement is therefore of smooth character without grabbing or sudden jerks. This partial engagement of the clutch plates causes the fan to begin to rotate, and as it picks up speed, the fan tends to pull driven hub 26 further to the left as viewed in FIGURE 2 to further compress spring 34 to complete engagement of the clutch plates. As the speed of rotation of the fan increases, the force tending to apply the clutch plates increases and the clutch becomes completely engaged and drives the fan at the same speed as that of the drive hub 10.

When the radiator has become sufficiently cooled due to the greater volume of air passing through it, the temperature of the air passing over the power element drops, allowing the power element to contract and remove the load from piston 41. Thus, all of the force of spring 34 is attempting to separate the clutch plates. This resistance to the fan pull exerted by spring 34 is sufficiently high that the thrust to the left arising from the fan pull is not enough to keep the clutch plates completely engaged. As the clutch slips, the fan speed and pull decrease, allowing greater slip until the clutch is completely released and the fan returns to its normal idle speed.

It will be apparent that clutch engagement is accomplished in two steps. In the initial step, a force tending to engage the clutch is initiated as a result of temperature rise. This force causes partial clutch engagement against the action of the clutch release spring. With partial engagement of the clutch, the fan begins to rotate and the fan blades exert a thrust on the fan hub to further apply the clutch plates. At some speed of rotation, the combination of clutch apply forces is sufficient to cause complete clutch engagement. However, neither force in and of itself is sufficient to complete the clutch engagement. Thus, assuming the fan is rotating at high speed, and power element 37 is cooled down, the thrust exerted on fan hub 26 by fan blades 27 will not be sufficient to retain the clutch in engagement against the action of spring 34.

The arrangement is of a simple and compact construction, is economical to manufacture, and provides smooth engagement of the clutch without any sudden jerks. Two forces acting in conjunction are required to complete the clutch engagement. The initiating force applied by power unit 37 is a temperature controlled force. The completion force arising from fan blades 27 is a speed controlled force. The temperature controlled clutch engaging force applied by unit 37 is calibrated with that of spring 34 such that the fan is initially driven through the slipping clutch discs for smooth initial fan drive. As the speed of the fan increases, fan 27 applies an assisting force to that of power element 37 which, in conjunction with the action of power element 37, will completely engage the clutch discs at a predetermined fan speed. The fan drive assembly is very compact in space requirements, is economical to manufacture and service, and is very smooth in operation.

What is claimed is:

1. A fan drive comprising in combination, a drive hub, a driven hub, clutch plates carried by said hubs, respectively, said clutch plates each being movable axially with respect to said drive hub and driven hub, respectively, and adapted to be alternately engaged and released, means supporting said driven hub on said drive hub for both rotary and axial motion with respect to said drive hub, means biasing said driven hub axially on said drive hub to release said clutch plates, temperature responsive means including an expandable and contractable power element operatively connected to said driven hub effective upon a rise in temperature to move said driven hub axially upon said drive hub to partially engage said clutch plates, fan blades carried by said driven hub, said fan blades being effective in conjunction with said temperature responsive means to exert sufficient thrust on said driven hub to complete engagement of said clutch plates.

2. A fan drive assembly comprising in combination, a drive hub, a driven hub, clutch plates carried by said hubs, respectively, said clutch plates each being movable axially with respect to said drive hub and driven hub, respectively, and adapted to be alternately engaged and released, means supporting said driven hub on said drive hub for both rotary and axial motion with respect to said drive hub, force applying means operative on said driven hub for positioning said driven hub axially upon said drive hub to release said clutch plates, temperature responsive means including an expandable and contractable power element operably connected to said driven hub for applying force on said driven hub to position said driven hub axially upon said drive hub to partially engage said clutch plates, fan blades carried by said driven hub and effective when said clutch is partially engaged to exert a thrust on said driven hub to complete engagement of said clutch plates, the forces applied to said driven hub by said temperature responsive means being individually less than the force applied to said driven hub by said first mentioned force applying means and in combination greater than the force applied to said driven hub by said first mentioned force applying means.

3. A fan drive comprising in combination, a drive hub, a driven hub, clutch plates carried by said hubs, respectively, said clutch plates each being movable axially with respect to said drive hub and driven hub, respectively, and adapted to be alternately engaged and released, means supporting said driven hub on said drive hub for both rotary and axial motion with respect to said drive hub, force applying means operative upon said driven hub to position said driven hub axially upon said drive hub to release said clutch plates, fan blades carried by said driven hub, temperature responsive means including an expandable and contractable power element operably connected to said driven hub effective upon a rise in temperature to move said driven hub axially upon said drive hub to partially engage said clutch plates to initiate drive of said fan blades, said fan blades applying a force to said driven hub effective upon said driven hub to move said driven hub axially upon said drive hub to complete engagement of said clutch plates, the force applied to said driven hub by said fan blades being variable with changes in speed of rotation of said fan blades.

4. A fan drive assembly comprising in combination, a drive hub, a driven hub, engageable and releasable clutch plates carried by said hubs, respectively and axially movable with respect to said hubs, respectively, bearing means supporting said driven hub on said drive hub for axial and rotary motion with respect to said drive hub, spring means yieldably biasing said driven hub to a position on said drive hub wherein said clutch plates are released, an expandable and contractable temperature responsive power element operatively connected to said driven hub and effective upon a rise in temperature to move said driven hub axially upon said drive hub against the action of said spring means to partially engage said clutch plates, fan blades carried by said driven hub, said fan blades being effective in response to rotation thereof to apply additional force to said driven hub to move said driven hub further against said spring means to complete engagement of said clutch plates.

5. A fan drive assembly comprising in combination, a drive hub, a driven hub, engageable and releasable clutch plates carried by said hubs, respectively and axially movable with respect to said hubs, respectively, bearing means supporting said driven hub on said drive hub for axial and rotary motion with respect to said drive hub, spring means yieldably positioning said driven hub on said drive hub to release said clutches, an expandable and contractable temperature responsive power element operatively connected to said driven hub and effective upon a rise in temperature to position said driven hub axially upon said drive hub to partially engage said clutch plates, fan blades carried by said driven hub, said fan blades being effective in response to rotation thereof to apply an additional force to said driven hub effective in conjunction with the action of said power element to position said driven hub on said drive hub to complete the engagement of said clutch plates, said spring means being effective at reduced temperatures of said power element to position said driven hub axially on said drive hub to release said clutch plates irrespective of the speed of rotation of said fan blades.

6. A fan drive assembly comprising in combination, a drive hub, a driven hub, means supporting said driven hub on said drive hub for both rotary and axial motion with respect to said drive hub, clutch members carried by said drive hub and driven hub respectively and adapted to be alternately engaged and released, spring means exerting a force on said driven hub to release said clutch.

members, a temperature responsive power element operative upon said driven hub and effective at elevated temperatures to partially engage said clutch members, fan blades carried by said driven hub, said fan blades being effective in response to rotation thereof to apply an additional thrust to said driven hub, said additional thrust acting in assistance to said power element to complete the engagement of said clutch members, said spring means being effective to release said clutch members when said temperature responsive power element is cooled below a predetermined temperature irrespective of the speed of rotation of said driven hub.

7. A fan drive assembly comprising in combination, a drive hub, a driven hub, engageable and releasable clutch discs carried by said hubs, respectively, bearing means supporting said driven hub on said drive hub for axial and rotary rotation with respect to said drive hub, said driven hub being effective in one axial position on said drive hub to release said clutch discs, said driven hub being effective in a second axial position on said drive hub to partially engage said clutch discs, said driven hub being effective in a third axial position on said drive hub to completely engage said clutch discs, spring means for positioning said driven hub in said first position, a temperature responsive power element effective at elevated temperatures to position said driven hub in said second position, fan blades on said driven hub, said fan blades being effective when rotated to exert a thrust on said driven hub, said power element and the thrust of said fan blades being effective to move said driven hub to said third position, said spring means being effective to position said driven hub in said first position irrespective of the thrust applied to said driven hub by said fan blades when said temperature responsive power element has cooled a predetermined amount.

8. A fan drive assembly comprising in combination, a drive hub, a driven hub, engageable and releasable clutch discs carried by said hubs, respectively, a bearing race on said drive hub, bearing means between said race and said driven hub supporting said driven hub on said drive hub for rotary and axial motion with respect to said drive hub, a reaction member fixed to said bearing race, a spring seated upon said reaction member yieldably biasing said driven hub to position said driven hub axially with respect to said drive hub to release said clutch discs, a recess in said drive hub, a retainer seated upon said reaction member and having a portion thereof extending into said recess, a cover fixed to said driven hub and having an opening therethrough, a temperature responsive power element having a head portion external of said cover and a reduced portion extending through said opening, means securing said power element to said cover, said power element including a piston in said reduced portion effective at elevated temperatures of said power element to apply force to said retainer, said power element being effective at said elevated temperatures to move said cover and driven hub axially against said spring to partially engage said clutch discs, fan blades carried by said driven hub, said fan blades being effective upon rotation thereof to apply a force to said driven hub acting in assistance to the force of said power element to complete the engagement of said clutch discs.

9. A fan drive comprising in combination, an engine driven power input shaft, a drive member supported upon and driven by said power input shaft, said drive member comprising an axially extending cylindrical member, a radially extending web and an axially extending annular flange supported upon the periphery of said web, a clutch element supported in said flange and axially movable with respect thereto, a driven hub supported upon said cylindrical member for both rotary and axial motion with respect thereto, said driven hub having a portion thereof disposed within said annular flange and adjacent said web, a driven clutch element supported upon said driven hub and axially movable with respect thereto, fan blades supported upon said driven hub, a temperature responsive power element supported within said drive member, means connecting said power element to said driven hub for imparting axial motion to said driven hub in response to temperature variation, said power element being effective in response to rise in temperature to only initiate engagement of said clutch elements, said fan blades being effective upon rotation thereof to impart an axial thrust to said driven hub to complete engagement of said clutch elements.

10. A fan drive comprising in combination, an engine driven power input shaft, a drive member supported upon and driven by said power input shaft, said drive member comprising an axially extending cylindrical member, a radially extending web and an axially extending annular flange at the periphery of said web, a plurality of drive clutch elements carried by said flange and axially movable with respect thereto, resilient means carried by said flange and disposed between said drive clutch elements for separating the same, a driven hub supported upon said cylindrical member for both rotary and axial motion with respect thereto, said driven hub having a portion thereof disposed within said annular flange, a plurality of driven clutch elements supported upon said driven hub for axial motion with respect thereto, resilient means carried by said driven hub and disposed between said driven clutch elements for separating the same, fan blades carried by said driven hub, a temperature responsive power element supported upon said axially extending cylindrical member, means connecting said power element to said driven hub for imparting axial motion to said driven hub in response to actuation by said power element, said power element being responsive to temperature rise to only initiate engagement of said clutch elements, said fan blades being effective in response to rotation thereof to apply an axial thrust to said driven hub acting in assistance to said power element and tending to complete engagement of said clutch elements.

11. A fan drive comprising in combination, an engine driven power input shaft, a drive member supported upon and driven by said power input shaft, said drive member comprising an axially extending cylindrical member, a radially extending web and an axially extending annular flange supported upon the periphery of said web, a clutch element supported in said flange for axial motion with respect thereto, a driven hub supported upon said cylindrical member for both axial and rotary motion with respect thereto, said driven hub having a portion thereof disposed within said annular flange, a driven clutch element on said driven hub and axially movable with respect thereto, fan blades carried by said driven hub, a temperature responsive power element carried by said cylindrical member, a reaction member, spring means seated upon said reaction member and yieldably biasing said driven hub with respect to said drive member to disengage said clutch elements, and a cover member enclosing said spring and reaction member effective to transmit force from said power element to said driven hub, said power element being effective in response to temperature rise to only partially engage said clutch elements in slipping engagement, said fan blades being effective in response to rotation thereof to impart a thrust to said fan hub to complete the engagement of said clutch elements.

12. A fan drive comprising in combination, an engine driven power input shaft, a drive member supported for rotation upon and driven by said power input shaft, said drive member comprising an axially extending cylindrical member coaxial with said power input shaft, a radially extending web and an axially extending annular flange supported upon the periphery of said web, a clutch element supported in said flange for axial motion with respect thereto, a driven hub supported upon said cylindrical member for both axial and rotary motion with respect thereto, said driven hub having a portion thereof disposed within said flange, a driven clutch element on said driven hub and axially movable with respect thereto, fan blades carried by said driven hub, a recess in said cylindrical member, a reaction member, a spring seated upon said reaction member and said driven hub normally biasing said hub to position said clutch elements in spaced relation with respect to each other, a retainer in said recess having one end thereof seated upon said reaction member, a cover fixed to said driven hub and having an opening therethrough, a temperature responsive power element having a head portion external of said cover and a reduced portion extending through said opening into said recess, means securing said power element to said cover, said power element including a plunger effective at elevated temperatures to apply a force to said retainer, said power element being effective at said elevated temperatures to move said cover and said driven hub axially against said spring to partially engage said clutch elements, said fan blades being effective upon rotation thereof to apply a force to said driven hub acting in assistance to said power element to complete the engagement of said clutch elements.

References Cited in the file of this patent

UNITED STATES PATENTS

| | | |
|---|---|---|
| 1,482,498 | Wills | Feb. 5, 1924 |
| 2,005,468 | Modine | June 18, 1935 |
| 2,786,456 | Heiss | Mar. 26, 1957 |